(No Model.)

C. E. GENSCH.
LIFE PRESERVER.

No. 282,627. Patented Aug. 7, 1883.

WITNESSES:
Jos. N. Rosenbaum.
Carl Karp.

INVENTOR
Charles E. Gensch
BY Paul Goepel
ATTORNEY

UNITED STATES PATENT OFFICE.

CHARLES E. GENSCH, OF NEW YORK, N. Y.

LIFE-PRESERVER.

SPECIFICATION forming part of Letters Patent No. 282,627, dated August 7, 1883.

Application filed February 3, 1883. (No model.)

*To all whom it may concern:*

Be it known that I, CHARLES E. GENSCH, of the city, county, and State of New York, have invented certain new and useful Improvements in Life-Preservers, of which the following is a specification.

This invention has reference to that class of life-preservers which are applied in the form of a vest to the chest of the wearer, and then filled with air, so as to support the wearer in the water; and the invention consists of a life-preserving vest provided with shoulder-straps and front fastening devices, and with double-walled side portions below the armpits, said double-walled portions being widest at the upper part and tapering toward the lower end, and connected by a channel at the back, so that both can be filled with air by a valved air-supply tube connected to one of the double-walled portions.

Figure 1:
Figure 2:
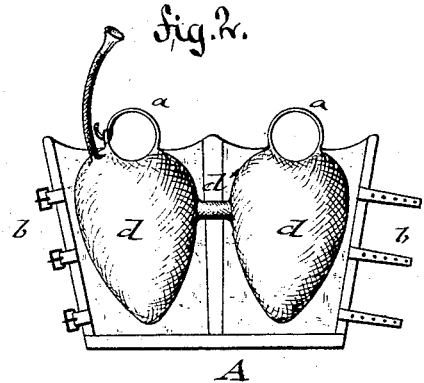
Figure 3:
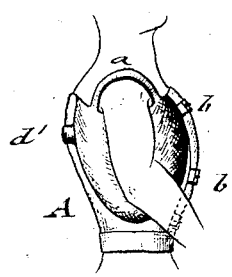

In the accompanying drawings, Figure 1 represents a perspective view of my improved life-preserving vest shown as applied to the body. Fig. 2 is a detail view, shown as flattened out; and Fig. 3 is a side view of the same.

Similar letters of reference indicate corresponding parts.

A represents a life-preserving vest, which is made of rubber or other suitable air and water proof material, and preferably lined at the inside with flannel or other similar fabric. The vest A is not extended over the shoulders, but provided with shoulder-straps $a\ a$, one of which is preferably arranged with a buckle for greater facility in putting the vest on in case of danger. The vest is closed in front, either by means of buckles and straps $b\ b$, as shown in Fig. 2, or other suitable fastening devices. The vest A is made with double-walled portions $d\ d$ at both sides, below the armpits, said double-walled portions extending from the front to the back, and being made widest at the upper part, and of gradually tapering or diminishing width toward the waistband, as shown clearly in Figs. 1 and 2. The double-walled portions $d\ d$ are connected, preferably at the back, by a small channel, $d'$, for the passage of the air from one of the double-walled portions $d$ to the other. To the upper part of one double-walled side portion $d$ is preferably applied a valved air-supply pipe, $e$, by which the double-walled portions $d\ d$ are filled with air after the vest has been applied to the body, so that they form then two bulging air-cushions below the armpits and at both sides of the body. These air-cushions serve to support the body in upright position in the water, while leaving the chest, arms, and feet perfectly free.

The life-preserver may be worn on the body below the clothes; or it may be folded up and stored away ready for used when required.

Having thus described my invention, I claim as new and desire to secure by Letters Patent—

In a life-preserver, the air-cushions $d\ d$, provided with an air-supply pipe and connected by an air-channel, in combination with a lining provided with body-fastening straps and buckles and the shoulder-straps, one of which has a buckle, said cushions being wider at their upper than at their lower parts, thus securing the largest volume of air directly under and on both sides of the armholes, which will support the body and neck of the wearer in upright position, substantially as described.

In testimony that I claim the foregoing as my invention I have signed my name in presence of two subscribing witnesses.

CHARLES E. GENSCH.

Witnesses:
 CARL KARP,
 SIDNEY MANN.